United States Patent [19]

Karagozian et al.

[11] 3,752,601
[45] Aug. 14, 1973

[54] HIGH PRESSURE LIQUID PUMP

[75] Inventors: Jack Karagozian, Farmington; William E. Rudnicki, Livonia, both of Mich.

[73] Assignee: Ford Motor Company, Dearborn, Mich.

[22] Filed: Sept. 22, 1971

[21] Appl. No.: 182,599

[52] U.S. Cl. .................................. 417/300, 417/311
[51] Int. Cl. ............................................. F04b 49/08
[58] Field of Search ............................... 417/300, 311

[56] References Cited
UNITED STATES PATENTS

| | | | |
|---|---|---|---|
| 3,200,752 | 8/1965 | Clark et al. | 417/300 |
| 2,996,013 | 8/1961 | Thompson et al. | 417/300 |
| 3,273,503 | 9/1966 | Clark et al. | 417/300 |

Primary Examiner—Carlton R. Croyle
Assistant Examiner—R. J. Sher
Attorney—Keith L. Zerschling et al.

[57] ABSTRACT

A liquid pump adapted especially for use in a power steering system in an automotive vehicle comprising a pump rotor mounted for rotation within a cam ring, port plates and upper and lower seal plates arranged in axially stacked relationship and cooperating with a surrounding housing to define a pressure cavity on one side of the upper seal plate which is in fluid communication with the discharge port and the port plates, and an integral flow control and pressure relief valve assembly located in the housing independently of the pump rotor and cam ring in fluid communication with the discharge ports thereby providing a pump assembly of reduced axial dimensions and a pump flow and pressure control that has improved reliability.

2 Claims, 9 Drawing Figures

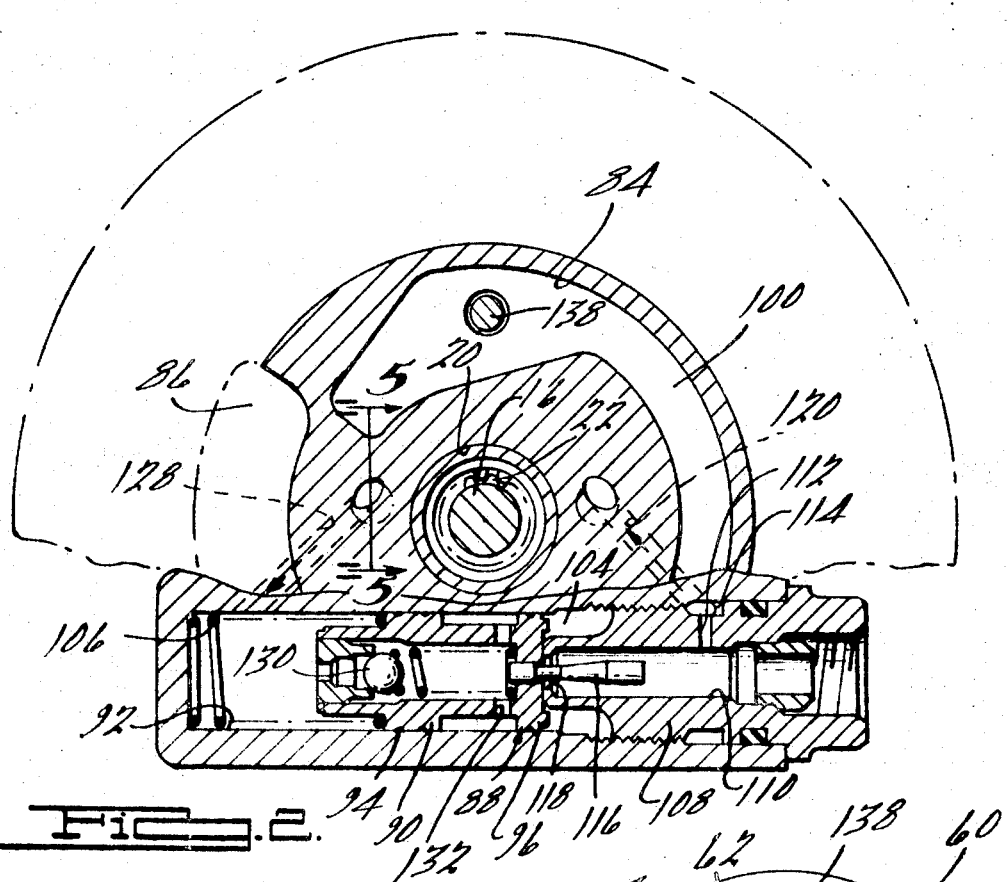
FIG. 2.
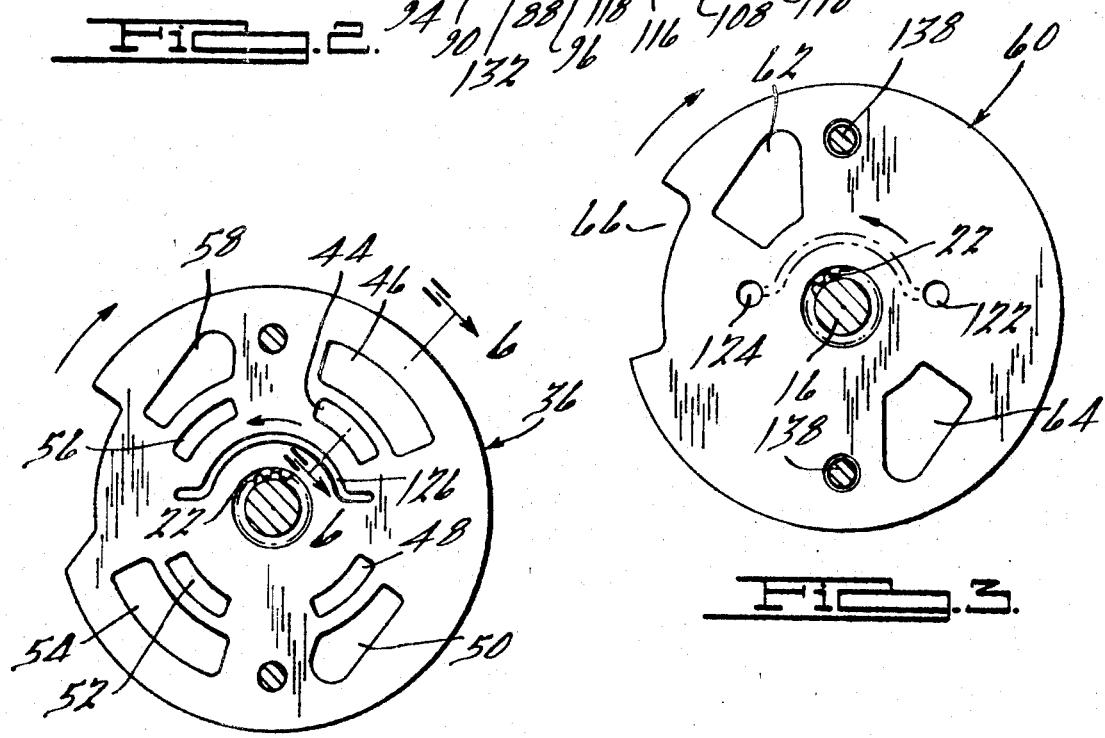
FIG. 4.
FIG. 3.

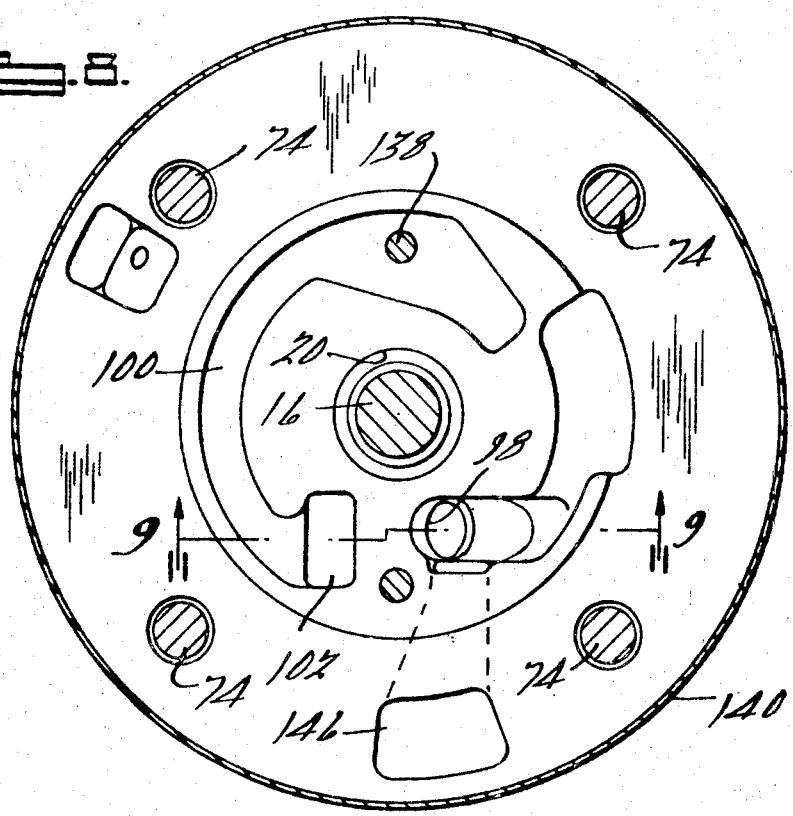
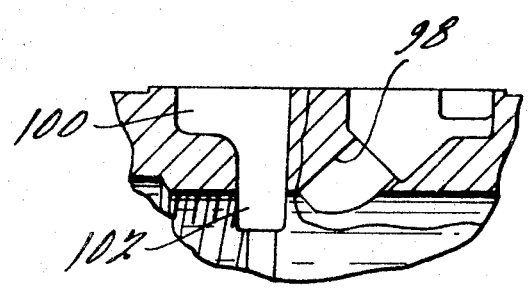

HIGH PRESSURE LIQUID PUMP

GENERAL DESCRIPTION OF THE INVENTION

Our invention is adapted to be used in a power steering system for an automotive vehicle for supplying circuit pressure to pressure operated members of the steering system. It is an improvement in pump structures of the type shown in U.S. Pat. Nos. 3,200,752, 2,996,013 and 3,273,503.

Positive displacement pumps of the type shown in patent No. 3,200,752, for example, include a pump rotor mounted for rotation in a pump cam ring. The rotor carries slippers or vanes which engage slidably in the inner surface of the cam ring so that they are caused to reciprocate radially as the rotor is driven. The spaces between the vanes or slippers define fluid pumping chambers which carry fluid from an inlet port communicating with the pump cavity at one location and deliver it under pressure to an outlet port at another location. The ports are formed in end plates situated on either axial side of the rotor and cam ring assembly. A port plate engages the one side of one of the end plates and it is urged into sealing engagement with that side by fluid pressure situated in a pressure cavity that is defined in part by the pump housing which surrounds the end plates, the port plate and the rotor and cam ring assembly.

In our improved pump construction, internal passage structure extends from the outlet ports to the inlet side of a flow control and pressure relief valve assembly which is located in the main pump housing where it is isolated from the high temperature oil that circulates through the pump and the reservoir. The reservoir is defined by the pump housing which surrounds the cam and rotor assembly although it is isolated from the previously mentioned pressure cavity defined by that same pump housing. The outlet side of the valve assembly communicates with the power steering gear.

Fluid returned from the power steering gear is distributed to the reservoir through a suitable return passage.

It is a principal object of our invention to provide a high pressure pump of sufficient capacity to maintain the pressure requirements of a power steering gear while reducing to a minimum the axial dimensions of the assembly thereby permitting the pump assembly to be packaged in the engine compartment of an automotive vehicle without interference from the other vehicle engine and chassis components.

The main housing portion within which the valve assembly is situated remains at a substantially uniform temperature and changes in dimension due to changes in temperature are avoided. This improves the flow and pressure control characteristics of the valve assembly and improves the reliability of the pump. Also the noise normally associated with pressure regulation and flow control in a valve system of this type is reduced because the main housing portion of the pump, which is relatively massive, tends to eliminate or reduce acoustical disturbances resulting from the normal fluid flow valving action.

BRIEF DESCRIPTION OF THE FIGURES OF THE DRAWING

FIG. 2 is a cross sectional view taken along the plane of section line 2—2 of FIG. 1;

FIG. 3 is a view of a plate situated between the main housing portion and one of the end plates of the assembly in FIG. 1 as seen from the plane of section line 3—3 of FIG. 1;

FIG. 4 is a view of one of the end plates of FIG. 1 as seen from the plane of section line 4—4 of FIG. 1;

FIG. 8 is a view of the main housing portion of the assembly in FIG. 1 as seen from the plane of section line 8—8 of FIG. 1.

FIG. 9 is a cross sectional view taken along the plane of section line 9—9 of FIG. 8.

PARTICULAR DESCRIPTION OF THE INVENTION

Figure 1:
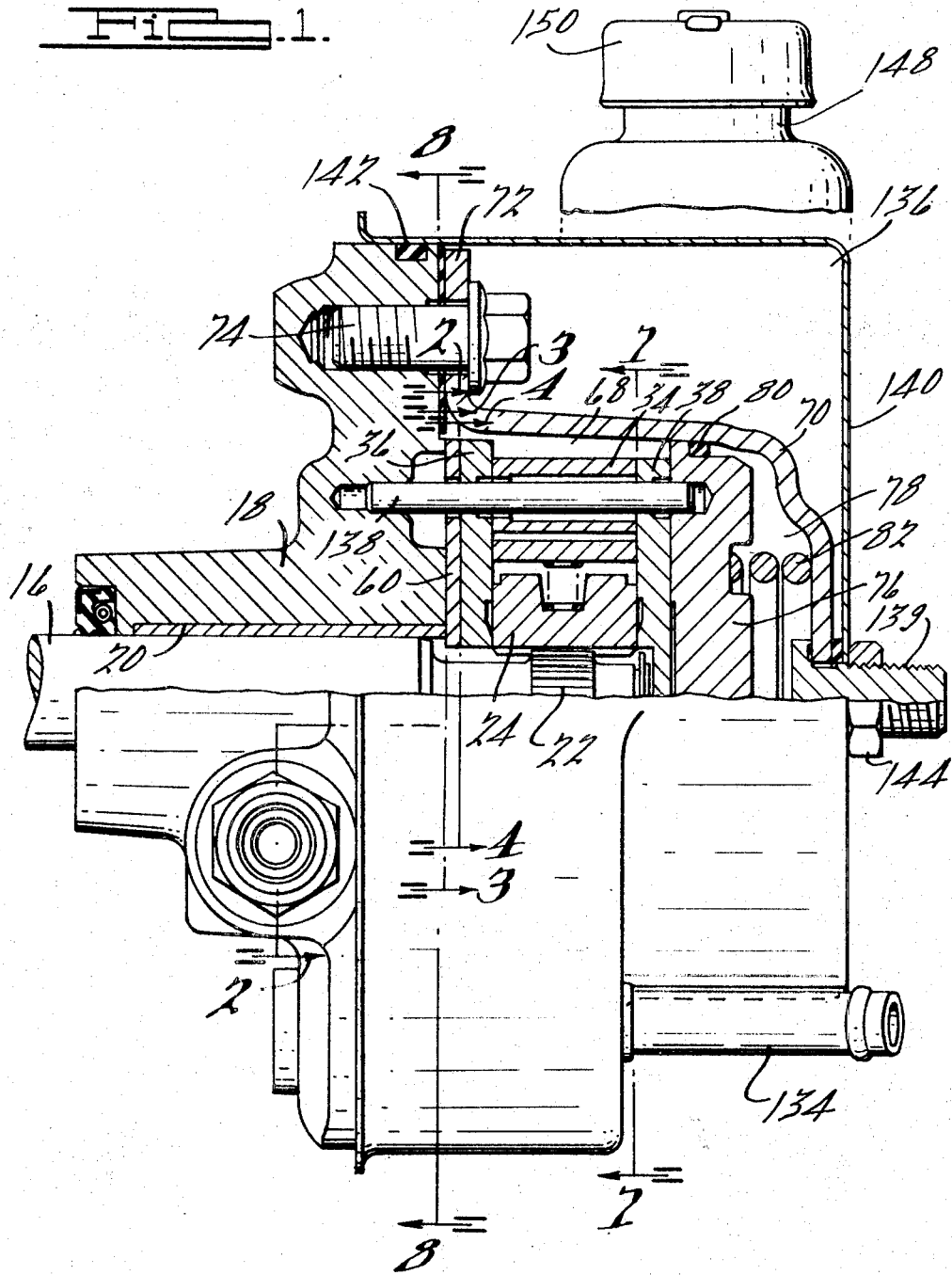
FIG. 1 is a cross sectional view of a power steering pump assembly embodying the improvements of our invention.
Figure 6:
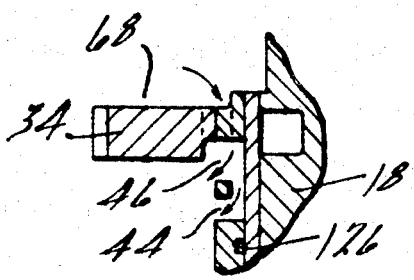
FIG. 6 is a cross sectional view taken along the plane of section line 6—6 of FIG. 4.
Figure 5:
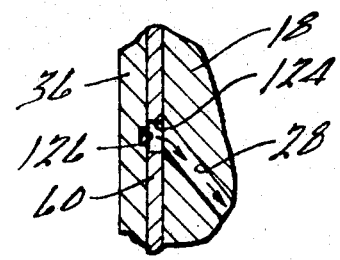
FIG. 5 is a cross sectional view taken along the plane of section line 5—5 of FIG. 2.

Numeral 16 designates a driveshaft for the pump assembly and may be connected to a drive pulley which in turn is drivably coupled to the engine crankshaft through a suitable drive belt. Shaft 16 is journalled rotatably in main housing portion 18 of the pump assembly. It is received within bearing opening 20 and is journalled therein by a bushing as indicated. Shaft 16 is provided with an externally splined portion 22 which registers with internal splines formed in a central opening in pump rotor 24.

Rotor 24 is formed with slipper pockets 26. Slippers 28 disposed in the pockets 26 are urged radially outwardly by springs 30 into sliding engagement with the internal cam surface 32 of pump cam member 34. The surface 32 is defined by an out-of-round opening formed in cam member 34. The rotor and the cam cooperate to define a pair of opposed working chambers situated 180° out of position with respect to each other. The slippers, upon rotation of the rotor 24, displace fluid from an inlet port to an outlet port in each working chamber. Thus, two pumping strokes are provided for each revolution of the rotor 24. The inlet port and the outlet port for each pumping chamber are formed by port plates 36 and 38 which are situated on the opposite sides of the cam ring 34.

Figure 7:
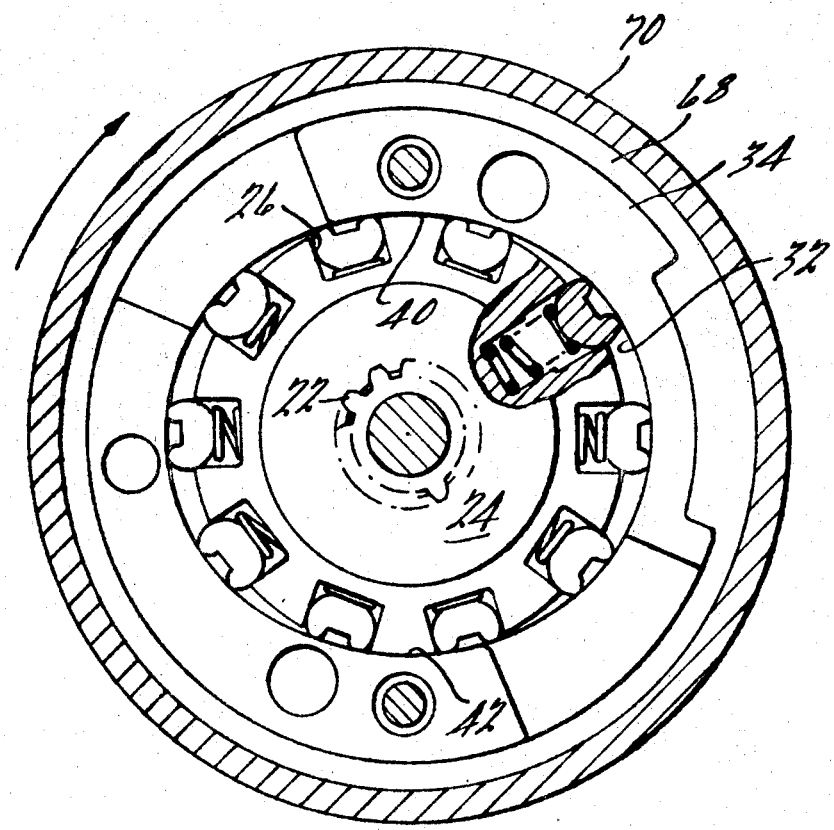
FIG. 7 is a cross sectional view as seen from the plane of section line 7—7 of FIG. 1 showing the pump rotor and cam ring assembly of FIG. 1.

Rotor 24 registers with the interior surface of the cam ring to define fluid seals identified by reference characters 40 and 42. The inlet port formed in plate 36 for the working chamber on the right-hand side of the view of FIG. 7 is identified in FIG. 4 by reference characters 44 and 46. The portion of the inlet port shown at 46 communicates with the radially outward side of the slippers and the portion 44 communicates with the radially inward side of the slippers. The outlet ports associated with the inlet ports 44 and 46 are shown at 48 and 50. Fluid entering the ports 44 and 46 is transferred through the working arc of the pump to the outlet ports 48 and 50. This pumping cycle is completed for each one half revolution of the rotor 24. The corresponding ports for the working arc on the left-hand side of the view of FIG. 7 also are indicated in FIG. 4. The inlet ports for the left-hand working arc are shown at 52 and 54 and the corresponding outlet ports for that working arc are shown at 56 and 58.

A second port plate 60 is situated directly adjacent the plate of FIG. 4. It is provided with a high pressure outlet port 62 for the left-hand working chamber of FIG. 7 and a high pressure outlet port 64 for the right-hand working chamber of FIG. 7. A marginal recess 66 in the plate 60 forms a portion of the inlet. It communicates with the low pressure chamber 68 which surrounds the cam ring 34. Chamber 68 is partly defined by a housing portion 70 which is a cup-shaped closure secured at its margin 72 to the main housing portion 18 by means of bolts 74. The housing portion 70 extends over the cam ring 34 and over an end plate 76 which is in sealing engagement with the right-hand surface of port plate 38. The plate 38 is substantially identical to the plate 36 although it is a mirror image of it. Its outlet ports communicate with porting formed in plate 76 which allows pressurized fluid to enter chamber 78. This chamber 78 is sealed from the chamber 68 by a peripheral O-ring 80 surrounding the plate 76. A spring 82 between the housing portion 70 and the plate 76 urges the plate 76 into sealing engagement with the port plate 38.

The main housing 18 is provided with high pressure porting 84 and low pressure inlet porting 86. This is best seen by referring to FIG. 2. The porting 84 is of sufficient arcuate extent to connect together the ports 62 and 64 in the port plate 60. The inlet porting 86 registers with the recess 66 and communicates with inlet ports 52 and 54 and inlet ports 44 and 46.

The valve for the pump assembly is shown in FIG. 2 at 88. It is situated within the main housing portion 18.

Valve 88 comprises a valve element 90 which is mounted slidably within valve chamber 92. Valve element 90 is formed with a pair of spaced valve lands 94 and 96. A flow return port 98, which is best seen in FIG. 8, communicates with valve chamber 92 at a location intermediate lands 94 and 96. Port 98 communicates also with the low pressure recess 86 in the housing 18.

Housing 18 is formed with a high pressure recess 100 which communicates with the outlet ports 62 and 64 in the port plate 60. This also is best seen in FIG. 8. The lowermost extremity of the recess 100, which is identified by reference character 102, communicates with annular space 104 in the valve 88. This space is situated on the right-hand side of the land 96 so that the pressure in recess 100 acts upon the valve spool 90 and urges it in a left-hand direction against the opposing force of valve spring 106 located in the left-hand end of the chamber 92 as viewed in FIG. 2. The right-hand end of the valve chamber 92 is received in threaded fitting 108. This closes the right-hand end of the chamber 92. Fitting 108 is provided with a central discharge passage 110, which communicates with the pump outlet passage extending to the driven member of the system such as a power steering gear.

A flow bypass port 112 communicates with the passage 110 and extends to an annular recess 114 in the fitting 108. Connected to the valve spool 90 is a metering pin 116. This registers with an orifice 118 formed in the end of the fitting 108. The metering pin 116 is tapered so that when the spool 90 is displaced a predetermined amount, the fluid flow path through the passage 110 will be restricted progressively.

Annular groove 114 communicates with internal passage 120 formed in the housing 18. The end of passage 110 communicates with opening 122 formed in the port plate 60. Opening 122 is connected to opening 124 in the plate 60 through a horseshoe-shaped groove 126 formed in the adjacent port plate 36. Groove 126 forms a part of a crossover passage that connects port 112 to the left side of valve spool 90. Port 112 senses velocity pressure in passage 110 due to pressure drop across the orifice 118 as the pin 116 controls the flow restriction. Port 112 distributes a pressure signal to valve spool 90 which causes the latter to respond to changes in flow. Opening 124 in turn communicates with the left-aand end of the chamber 92 through internal passage 128 formed in the housing 18.

A pressure relief check valve 130 is located within the valve spool 90. It establishes a one-way fluid connection between the left-hand end of the chamber 92 and the interior of the spool 92, which interior is in communication with the annular space between the valve lands 94 and 96. This communication is established by port 132 in the valve spool 90.

Upon movement of the valve spool 90 in a left-hand direction due to a pressure buildup on the high pressure side of the pump, flow is bypassed to the low pressure side of the pump as the port 98 is progressively uncovered. Continuous movement of the valve spool 90 in a left-hand direction due to an increase in the driven speed of the pump results in a flow restriction due to the metering element 116.

Fluid is returned from the driven power steering gear through a flow return passage which connects to fluid fitting 134 to establish a return flow path to the reservoir chamber 136. The cam ring 34 and plates 36, 64 and 38 are held in fixed angular disposition with respect to each other and with respect to plates 76 by locating pins 138. A mounting element 138 is connected to housing portion 70 to permit a suitable connection with a mounting bracket which holds the pump assembly in a suitable operating position within the vehicle engine compartment.

Reservoir chamber 136 is defined by a reservoir cover 140 which encloses the housing 18. It is received over the margin of the housing 18 and is sealed by an O-ring 142 surrounding the periphery of the housing 18. Cover 140 is held in place by a retainer nut 144 which may be threadably received over the retainer 138. The reservoir 136 communicates with the low pressure recess 86 through a cored passage 146 formed in the housing portion 18 as best seen in FIG. 8. This provides makeup fluid for the pump to replace the fluid that is passed through the metered orifice 118 during pump operation.

Because of the strategic location of the valve assembly and the nested, compact arrangement of the pump members, the overall axial dimensions of the pump are substantially reduced in comparison to pumps such as those now used in power steering systems for automotive vehicles. Also the heated oil in the power steering system does not have an opportunity to adversely affect the performance of the valve since the valve is located within the relatively massive housing portion 18 where substantial uniformity in temperature can be achieved.

Fluid is supplied to the reservoir 136 through a suitable filter opening in filler tube 148 which may be closed by filler cap 150.

Having described a preferred form of our invention, what we claim and desire to secure by U.S. Letters Patent is:

1. A fluid pump comprising a main housing portion, a second housing portion having a cavity with an open end, said second housing portion being secured to one face of said main housing portion, a cam ring in said second housing portion and a pump rotor in said cam ring, pumping elements carried by said rotor in sliding engagement with the adjacent internal walls of said cam ring, said rotor and said cam ring cooperating to define a pumping chamber, first and second port plates located between said cam ring and the adjacent face of said main housing portion, a third port plate adjacent the opposite side of said cam ring, an end plate engaging said third port plate, said first and second port plates having a high pressure port and a low pressure port, means for sealing the interior of said second housing portion to define two separate fluid pressure chambers, one of said pressure chambers being situated on one side of said end plate and being in fluid communication with said high pressure ports whereby pressure in said one chamber acts upon said end plate and said second port plate and urge said end plate, said port plate and said cam ring into axially stacked relationship, the second pressure chamber in said second housing portion being of lower pressure and communicating with the inlet port in said first and second port plates, said main housing portion having a low pressure recess and a high pressure recess in communication respectively with said low pressure port and said high pressure port, a fluid delivery passage extending from said pump, valve means in said first housing portion and defining in part said fluid delivery passage for establishing flow control and pressure relief including a pressure sensitive valve element and a valve chamber slidably receiving said valve element, one side of said valve element being subjected to the pressure in said outlet port, and a bypass passage registering with said valve element and connecting said valve chamber with the low pressure port, a velocity pressure port in said delivery passage, a crossover passage extending from said velocity pressure port to the other side of said valve element comprising a pair of openings in said second port plate in communication respectively with said velocity pressure port and said other valve element side, a groove in one face of said first port plate, said one face engaging said second port plate and defining therewith a pressure distribution path, a fluid reservoir comprising an open end cover surrounding said first and second housing portions and cooperating with said first and second housing portions to define a reservoir chamber, means for sealing the outermost margin of said cover on said first housing portion, and an internal passage structure in said first housing portion providing fluid communication between said reservoir chamber and said low pressure port.

2. The combination as set forth in claim 1 wherein said first port plate is provided with two inlet ports situated 180° out of position with respect to each other and two outlet ports situated 180° out of position with respect to each other, said cam ring and said rotor defining two pumping chambers, each pumping chamber communicating with a separate inlet port and a separate outlet port in said first port plate, an end plate engageable with said second port plate and a fluid seal surrounding the periphery of said end plate and cooperating with said second housing to define the aforesaid first and second pressure chambers.

* * * * *